R. KLUG.
COMPRESSION STOP AND WASTE COCK.
APPLICATION FILED OCT. 23, 1917.

1,281,791.  Patented Oct. 15, 1918.

WITNESSES
J. Herbert Bradley.
Glenn H. Leresche.

INVENTOR
Richard Klug.
By Fred'k H. Hunter
Attorney.

UNITED STATES PATENT OFFICE.

RICHARD KLUG, OF PITTSBURGH, PENNSYLVANIA, ASSIGNOR TO THE OBERNDORF MANUFACTURING COMPANY, OF PITTSBURGH, PENNSYLVANIA, A CORPORATION OF PENNSYLVANIA.

COMPRESSION STOP AND WASTE COCK.

1,281,791.  Specification of Letters Patent.  Patented Oct. 15, 1918.

Application filed October 23, 1917. Serial No. 198,024.

*To all whom it may concern:*

Be it known that I, RICHARD KLUG, a resident of Pittsburgh, in the county of Allegheny and State of Pennsylvania, have invented a new and useful Improvement in Compression Stop and Waste Cocks, of which the following is a specification.

This invention relates to stop and waste cocks, and its object is to provide a device of this kind of simple construction, economical to manufacture, not liable to get out of order and in which the parts are so arranged that the liquid flow through the cock is positively shut off before the waste vent is opened, and vice versa, thus preventing the escape or waste of liquid under pressure.

Figure 1:
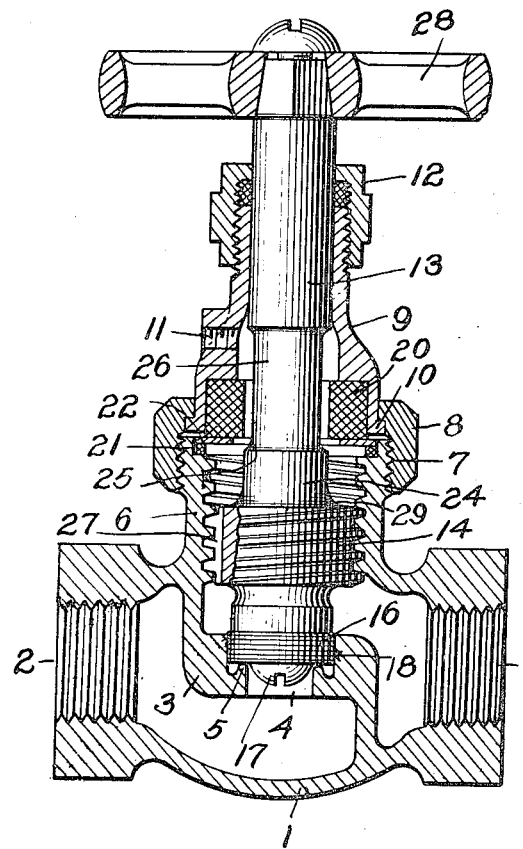
Figure 2:
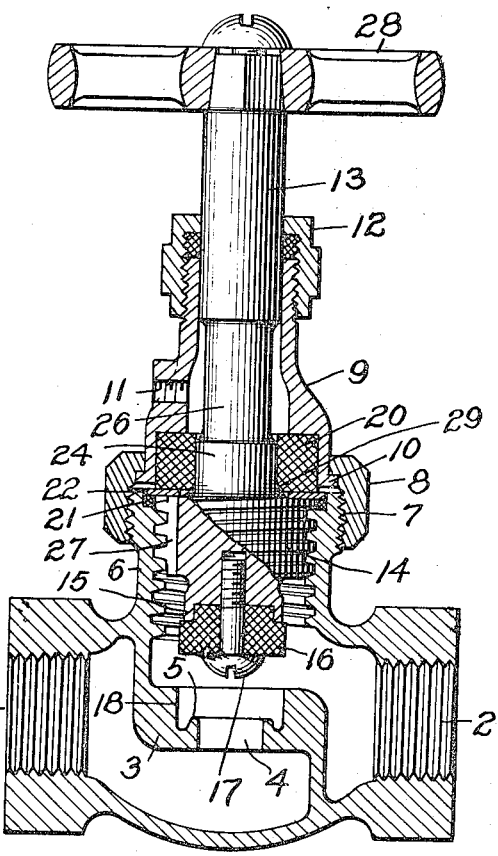
Figure 3:
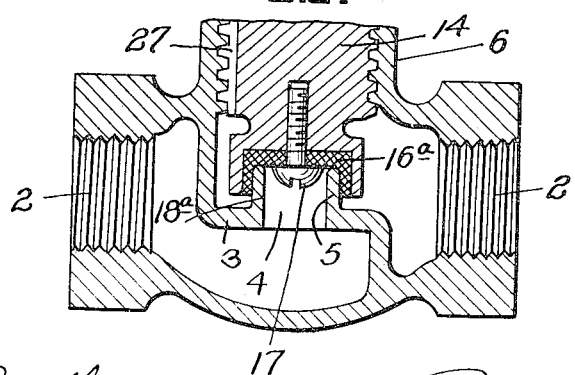

In the accompanying drawings Figure 1 is a central vertical section through the improved stop and waste cock, showing the same in closed position; Fig. 2 is a similar view showing the same in open position; and Fig. 3 is a detail view showing a modification.

The improved stop and waste cock comprises a body 1 having its ends threaded, as at 2, for attachment to the service pipes, and having the usual diaphragm 3 provided with the opening 4 surrounded by seat 5, said body having a tubular neck portion 6 in line with said valve opening 4. All of these parts are or may be of the construction and shape common in cocks of this character.

The neck 6 at its upper end is externally threaded, at 7, for receiving the union 8 which serves to couple to the casing the bonnet 9, such union overhanging an external flange 10 on the lower end of the bonnet, as is usual. This bonnet is provided with a waste outlet 11, and at its upper end is threaded to receive the stuffing box or packing nut 12 which closely surrounds the valve stem 13, as is common in valves of this type.

The valve stem near its lower end is provided with an enlarged portion having quick threads 14 which engage corresponding threads formed in the interior of the neck 6. The lower end of the valve stem is recessed at 15 to receive a rubber or fiber washer 16, which is held in place by means of a screw 17 on which said washer has a loose fit so that it can rotate thereon. This washer is circular and has a close fit in the cylindrical chamber formed by an annular wall 18 which surrounds the valve seat 5 and extends above said seat to a considerable height.

The lower end of the bonnet 9 on its interior, is cut out to form an annular recess in which is seated an annular packing member 20 of hard rubber, fiber or the like, which extends downwardly slightly below the lower face of the bonnet. The neck 6 on its interior is also cut out to form an annular recess in which is seated a rubber or fiber packing 21, and resting on this is a metal ring or washer 22, which normally projects slightly above the top face of said neck. The rubber or fiber packing 21 forms a water tight joint between the bonnet 9 and neck 6, when the union 8 is tightened. By having the annular packing member 20 project slightly below the lower face of the bonnet, it is possible, by tightening the union 8 more or less, to squeeze said annular packing so as to contract the opening therethrough and thus adjust the waste opening therethrough, as will hereinafter appear, and consequently vary the amount of water to be wasted.

The valve stem immediately above the threaded portion 14 is of substantially cylindrical form, as at 24, and of such diameter as to have a tight fit within the annular packing 20 when the stem is screwed upwardly as shown in Fig. 2, and above the portion 24 said stem is reduced in diameter, so that when the stem is moved downwardly as when the valve is closed, the shoulder 25 between the cylindrical portion 24 and the reduced portion 26 lies just below the annular packing 20, and said reduced portion 26 is of slightly less diameter than the internal diameter of said packing so as to permit the fluid to pass upwardly around said stem to the waste outlet 11. A groove 27 is cut vertically through the threads 14 on the stem so as to afford a communication between the chamber just above the valve seat and the chamber below the annular packing 20.

The parts are so proportioned that when the valve is closed, as shown in Fig. 1, the valve disk 16 bears against the valve seat 5, and the shoulder 25 on the valve stem, between the enlarged and reduced portions of said stem, lies below the lower edge of the annular packing 20. Consequently any liquid above the valve seat can flow through the groove 27 and through the space between the annular packing 20 and the reduced portion 26 of the stem and out through the waste orifice 11.

To open the valve the stem 13 is rotated, by means of any of the devices known for that purpose, the drawings showing a hand wheel 28 on the upper end of the stem. This raises the valve stem, and the parts are so proportioned that before the valve disk 16 reaches the top of the cylindrical wall 18 the upper end of the enlarged portion 24 of the stem has entered the opening in the lower end of the annular packing 20. Consequently, fluid under pressure can not find its way to the waste orifice 11. As the valve stem is further rotated the valve disk 16 is lifted entirely out of the cylindrical wall portion 18, thus opening the passage through the valve—the enlarged portion 24 of the stem entering still farther into the annular packing 20.

In closing the valve, the valve disk 16 enters the upper end of the cylindrical wall 18 before the enlarged portion 24 of the stem leaves the opening in the annular packing 20, so that the pressure is entirely cut off before the passage to the waste orifice is opened. As a result it is possible to reduce the full flow through the valve, without opening the waste orifice, it being impossible for the waste orifice to be open to the fluid under pressure, because it is not open to the chamber in the valve casing until the valve disk 16 has entered into the cylindrical wall 18 sufficiently to cut off the flow of liquid through the valve.

At the base of the cylindrical piston 24 is a fillet 29 which crowds up into the annular packing 20 when the valve is open, as shown in Fig. 2, thus insuring the closing of the waste passage even if the packing 20 becomes worn.

Fig. 3 shows a modification in which in lieu of the cylindrical wall 18 surrounding the valve seat, the valve seat uprises a considerable distance above the diaphragm 3 as a cylindrical wall 18ª, and the lower end of the valve stem is cupped, and contains a cupped valve disk 16ª which fits over the cylindrical wall 18ª, and prevents the opening of the passage through the valve except when the waste passage through the packing 20 is closed.

The valve described is of simple construction, is economical to manufacture, is not liable to get out of order, prevents all waste until the valve is fully closed, and enables the flow through the valve to be regulated from full flow to entirely closing off the flow before opening the waste orifice.

What I claim is:

1. In a stop and waste cock, the combination of a casing having a valve seat at the bottom of a cylindrical wall uprising from said seat and having a neck above said seat, a bonnet adjustably connected to said neck and provided with a waste outlet, an annular packing in said casing arranged to be compressed and the opening therethrough varied by the adjustable connection of the bonnet to the neck, and a valve stem having a threaded connection in said casing and at its lower end carrying a circular valve disk fitting within said cylindrical wall and controlling said valve seat and having a portion coöperating with said annular packing and controlling a passage to said waste orifice, said portion being arranged to open said waste passage when the valve disk is within said cylindrical wall and to keep said waste passage closed until said valve disk passes within said cylindrical wall.

2. In a stop and waste cock, the combination of a casing having a valve seat at the bottom of a cylindrical wall uprising from said seat and having a threaded neck above said seat, a bonnet adjustably connected to said neck and provided with a waste outlet, an annular packing in said bonnet arranged to be compressed and the opening therethrough varied by the adjustable connection of the bonnet to the neck, a valve stem having a threaded connection in said casing neck and at its lower end carrying a circular valve disk fitting within said cylindrical wall and controlling the passage through said valve seat, and a waste passage formed by said stem in combination with said annular packing and arranged to be open when valve is fully closed and to be closed before said valve disk passes above said cylindrical wall.

3. In a stop and waste cock, the combination of a casing having a valve seat at the bottom of a cylindrical wall uprising from said valve seat and having a threaded neck above said seat, a bonnet connected to said neck and provided with a waste outlet, an annular packing at the lower end of said bonnet, and a valve stem having a threaded connection in said casing neck and at its lower end carrying a circular valve disk fitting within said cylindrical wall and controlling said valve seat, and having above its threaded connection with the casing a portion arranged to seat in said annular packing and close the waste passage therethrough when the valve is open, and lying below said annular packing and opening the waste passage when the valve is closed.

4. In a stop and waste cock, the combination of a casing having a valve seat at the bottom of a cylindrical wall uprising from said seat and having a threaded neck above said seat, a bonnet coupled to said neck and provided with a waste outlet, an annular packing in said bonnet, and a valve stem threaded in said casing neck and at its lower end carrying a circular valve disk fitting within said cylindrical wall and controlling said valve seat, and above its threaded connection with the valve casing having an enlarged portion and above this a portion of reduced diameter, said parts being so arranged that when the valve disk is above the circular wall surrounding the valve seat the enlarged portion of the valve stem seats within the annular packing and closes the passage to the waste orifice, and after the said circular valve has entered circular wall the enlarged portion of the valve stem passes below the annular packing and opens the passage to the waste orifice.

5. In a stop and waste cock, the combination of a casing having a valve seat provided with a cylindrical portion, and with a threaded neck above the valve seat, a bonnet connected to said neck and provided with a waste outlet, an annular packing in said casing, and a valve stem threaded in said casing and at its lower end carrying a valve disk coöperating with said valve seat and the cylindrical portion thereof, and above its threaded connection with the valve casing having an enlarged portion and above this a portion of reduced diameter, whereby when the valve is open said enlarged portion of the stem is seated in the annular packing, and when the valve has entered the valve seat said enlarged portion of the stem comes below the annular packing to open a passage to the waste orifice.

6. In a stop and waste cock, the combination of a casing having a valve seat and having a neck above said seat, a bonnet connected with the said neck and provided with waste outlet, an annular packing projecting below said bonnet, a union connecting said bonnet to said neck and serving to compress said annular packing to vary the waste opening therethrough, and a valve stem having a threaded connection in said neck and at its lower end carrying a valve coöperating with said valve seat and arranged to have a material up and down movement without opening the passage through said valve seat, said valve stem having a portion coöperating with said annular packing and controlling a passage to the waste orifice, said portion being arranged to open said waste passage only when the valve is fully seated on said seat.

7. In a stop and waste cock, the combination of a casing having a valve seat and a threaded neck above the valve seat, a bonnet on said neck and provided with a waste outlet, an annular packing seated in the lower end of said bonnet and projecting below the same, a union connecting said bonnet to said neck and serving to compress said annular packing and adjust the waste opening therethrough, and a valve stem having a threaded connection in said casing neck and at its lower end carrying a valve disk controlling said valve seat, said stem having above its threaded connection with the casing a portion arranged to seat in said annular packing and close the waste passage therethrough when the valve is open and to lie below said annular packing and open the waste passage therethrough when valve is closed.

In testimony whereof I have hereunto set my hand.

RICHARD KLUG.

Witness:
GLENN H. LERESCHE.